US006513859B2

(12) United States Patent
Yuge

(10) Patent No.: US 6,513,859 B2
(45) Date of Patent: Feb. 4, 2003

(54) OPENING AND CLOSING APPARATUS FOR AN OPENING AND CLOSING MEMBER OF A VEHICLE

(75) Inventor: Masaaki Yuge, Kanagawa (JP)

(73) Assignee: Ohi Seisakusho Co., Ltd., Yokohama (JP)

( * ) Notice: Subject to any disclaimer, the term of this patent is extended or adjusted under 35 U.S.C. 154(b) by 0 days.

(21) Appl. No.: 09/955,932

(22) Filed: Sep. 20, 2001

(65) Prior Publication Data

US 2002/0032986 A1 Mar. 21, 2002

(30) Foreign Application Priority Data

Sep. 20, 2000 (JP) ....................................... 2000-284516

(51) Int. Cl.[7] .................................................. B60J 5/00

(52) U.S. Cl. ................................ 296/146.4; 296/146.8; 49/341

(58) Field of Search ....................... 296/56, 106, 146.4, 296/146.8; 49/339, 340, 341, 342, 345

(56) References Cited

U.S. PATENT DOCUMENTS

| | | | | | |
|---|---|---|---|---|---|
| 618,053 | A | * | 1/1899 | Brown | 49/340 |
| 1,238,308 | A | * | 8/1917 | Lea et al. | 49/345 |
| 1,615,878 | A | * | 2/1927 | Laird | 49/340 |
| 1,668,421 | A | * | 5/1928 | Rysdon | 49/341 |
| 2,194,650 | A | * | 3/1940 | Foster | 49/340 |
| 2,806,689 | A | * | 9/1957 | Miller | 49/340 |
| 3,425,161 | A | * | 2/1969 | Catlett et al. | 49/340 |
| 6,055,775 | A | * | 5/2000 | Dering et al. | 296/56 |
| 6,092,337 | A | * | 7/2000 | Johnson et al. | 296/56 |
| 6,137,249 | A | * | 10/2000 | Butler et al. | 296/56 |
| 6,142,551 | A | * | 11/2000 | Ciavaglia et al. | 296/146.4 |
| 6,220,649 | B1 | * | 4/2001 | Rife | 296/146.8 |
| 6,270,147 | B1 | * | 8/2001 | Butler et al. | 296/146.4 |
| 6,318,025 | B1 | * | 11/2001 | Sedlak | 296/56 |
| 6,367,199 | B2 | * | 4/2002 | Sedlak et al. | 296/56 |
| 6,378,392 | B1 | * | 4/2002 | Dombrowski et al. | 296/56 |
| 6,382,706 | B2 | * | 5/2002 | Yuge et al. | 296/146.4 |
| 6,398,288 | B1 | * | 6/2002 | Yuge | 296/146.4 |

FOREIGN PATENT DOCUMENTS

| | | |
|---|---|---|
| JP | 6-71852 | 10/1994 |

* cited by examiner

*Primary Examiner*—D. Glenn Dayoan
*Assistant Examiner*—Lori L Coletta
(74) *Attorney, Agent, or Firm*—Foley & Lardner

(57) ABSTRACT

The pinion pivotally mounted on a vehicle body by the axis parallel to a hinge axis is linked by the motor provided on the vehicle body so as to be rotated in forward and reverse directions, the rack engaging the pinion is provided on the edge of the rack rod having one end portion pivotally secured by a transversely directed axis on the portion spaced from the hinge axis of the opening and closing member, and the guide member which slidably engages the longitudinal guide groove provided on the rack rod and rotatably supports the rack rod around the axis parallel to the axis of the pinion is provided on the partial portion of the vehicle body slightly spaced from the pinion.

9 Claims, 6 Drawing Sheets

OPENING AND CLOSING APPARATUS FOR AN OPENING AND CLOSING MEMBER OF A VEHICLE

CROSS REFERENCE TO THE RELATED APPLICATION

The present application is based on Japanese Patent Application No. 2000-284516, which is incorporated herein by reference.

BACKGROUND OF THE INVENTION

1. Field of the Invention

The present invention relates to the opening and closing apparatus for the opening and closing member of a vehicle which is arranged such that the opening and closing member of the vehicle such as a back door, tail gate or the like is opened and closed by a motor drive.

2. Description of Related Art

In a conventional opening and closing apparatus, as shown in Japanese Utility Model Publication No. 06-71852U, there is an opening and closing apparatus which is arranged such that on a roof of a vehicle body, there is disposed a drive mechanism including a motor, a speed reduction device linked to the motor, a segment gear, which is horizontally rockable, engaging a pinion which is the output axis of the speed reduction device, and a rod having the front end portion pivotally secured to the segment gear and having the rear end portion connected to a door, and that the rod is moved back and forth by the rocking motion of the segment gear, thereby opening and closing the door.

In the conventional opening and closing apparatus as described above, however, the front end portion of the rod is connected to the segment gear using a ball joint etc. so that the rod can be vertically slantingly moved around its front end portion accompanying the opening and closing operation of the door, and hence the connection of the drive mechanism with the door becomes complicated, thus involving a cost overrun.

Also, since the segment gear is largely rocked along the roof surface, the attachment space for the drive mechanism must be made large, and accordingly the overhead clearance of a rear seat occupant is reduced.

SUMMARY OF THE INVENTION

In view of such problems as described above which the conventional art possesses, the invention has an object to provide the opening and closing apparatus for the opening and closing member of the vehicle which is arranged such that the drive mechanism body fixed to the vehicle body and the opening and closing member can be connected in a simple arrangement, thereby attaining a cost reduction, and moreover the attachment space for the drive mechanism body is reduced, thereby achieving the enlargement of an interior space.

According to the invention, the above problems are solved in the following manners.

(1) In the opening and closing apparatus for the opening and closing member of the vehicle which is arranged such that the opening and closing member pivotally supported on the vehicle body with a transversely directed hinge axis so as to be openable and closeable is opened and closed by the driving force of a motor, the pinion pivotally mounted on the vehicle body by the axis parallel to the hinge axis is arranged to be rotated in forward and reverse directions by the motor provided on the vehicle body, the rack engaging the pinion is provided on the edge of the rack rod having one end portion pivotally secured by a transversely directed axis on the portion separated from the hinge axis of the opening and closing member, and in a partial portion of the vehicle body slightly spaced from the pinion, there is provided the guide member which slidably engages the longitudinal guide groove provided on the rack rod and supports the rack rod so as to be rotatable about the axis parallel to the axis of the pinion.

(2) In the above opening and closing apparatus, the guide member may be pivotally mounted on the vehicle body by a transversely directed axis.

(3) Further, the guide groove may be provided on one side surface of the rack rod in the form of a U-shape in cross section, and the guide member is formed by the roller which rolls and slides along the upper and lower opposite surfaces of the guide groove.

(4) Furthermore, either side surface of the rack rod may be clamped by the retaining member provided on the vehicle body.

(5) Furthermore, the guide member may be provided on the opposite surface of the retaining member from one side surface of the rack rod.

(6) In the above opening and closing apparatus, a partial portion or an entire portion of the rack and guide groove may be shaped in a substantially arc-shape having a center of curvature on the pinion side.

(7) Further in the above opening and closing apparatus, the distance between the pitch line of the rack and the center line of the guide groove maybe changed along the longitudinal direction of the rack rod such that the tilt angle of the rack rod with respect to the straight line connecting the axle center of the pinion with the center of the guide member becomes less, the farther separated from a right angle.

DETAILED DESCRIPTION OF THE PREFERRED EMBODIMENTS

Figure 1:
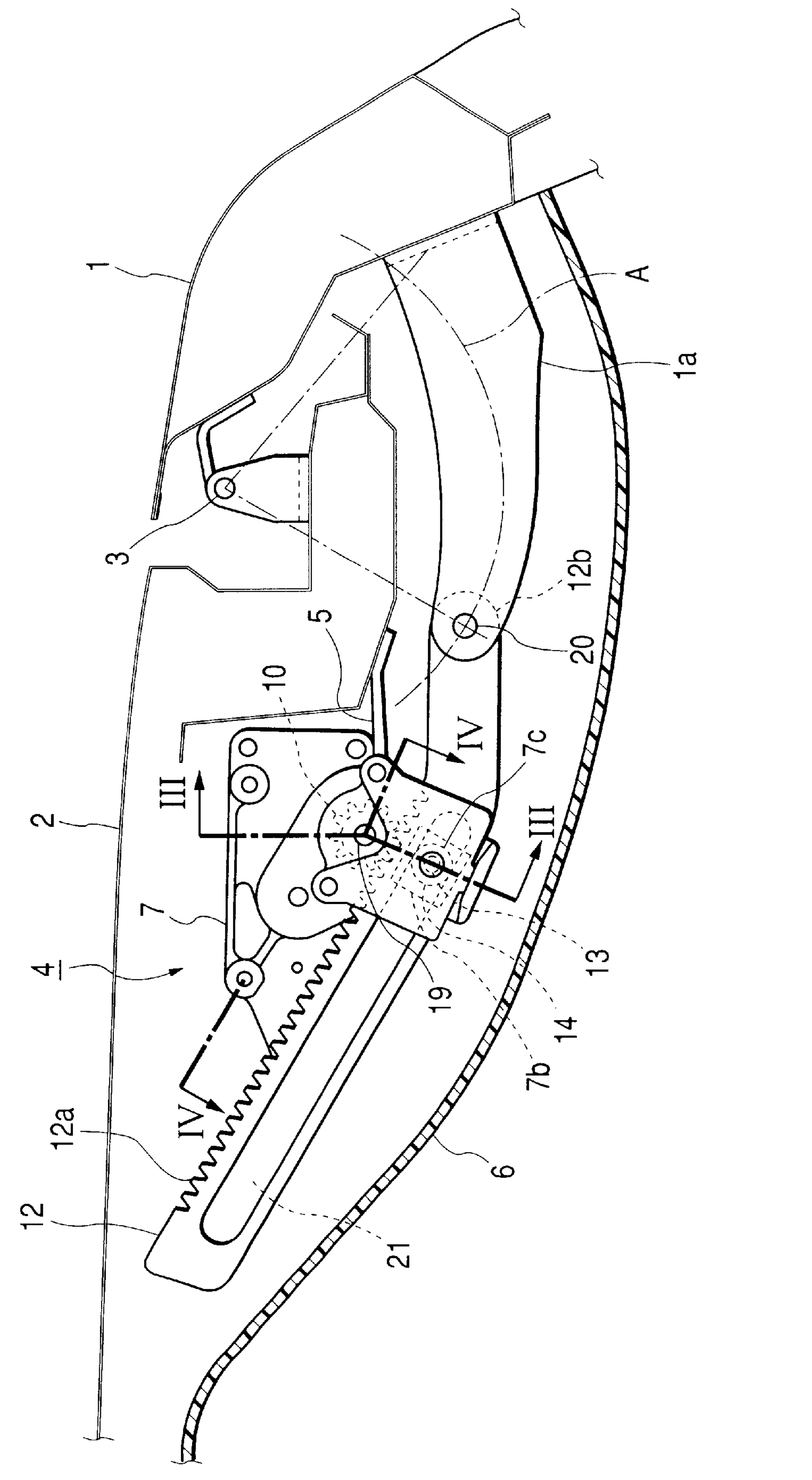
FIG. 1 is a schematic side view in longitudinal section of the rear portion of a vehicle when an opening and closing member is in closed-up position in a first embodiment of the invention.
Figure 2:
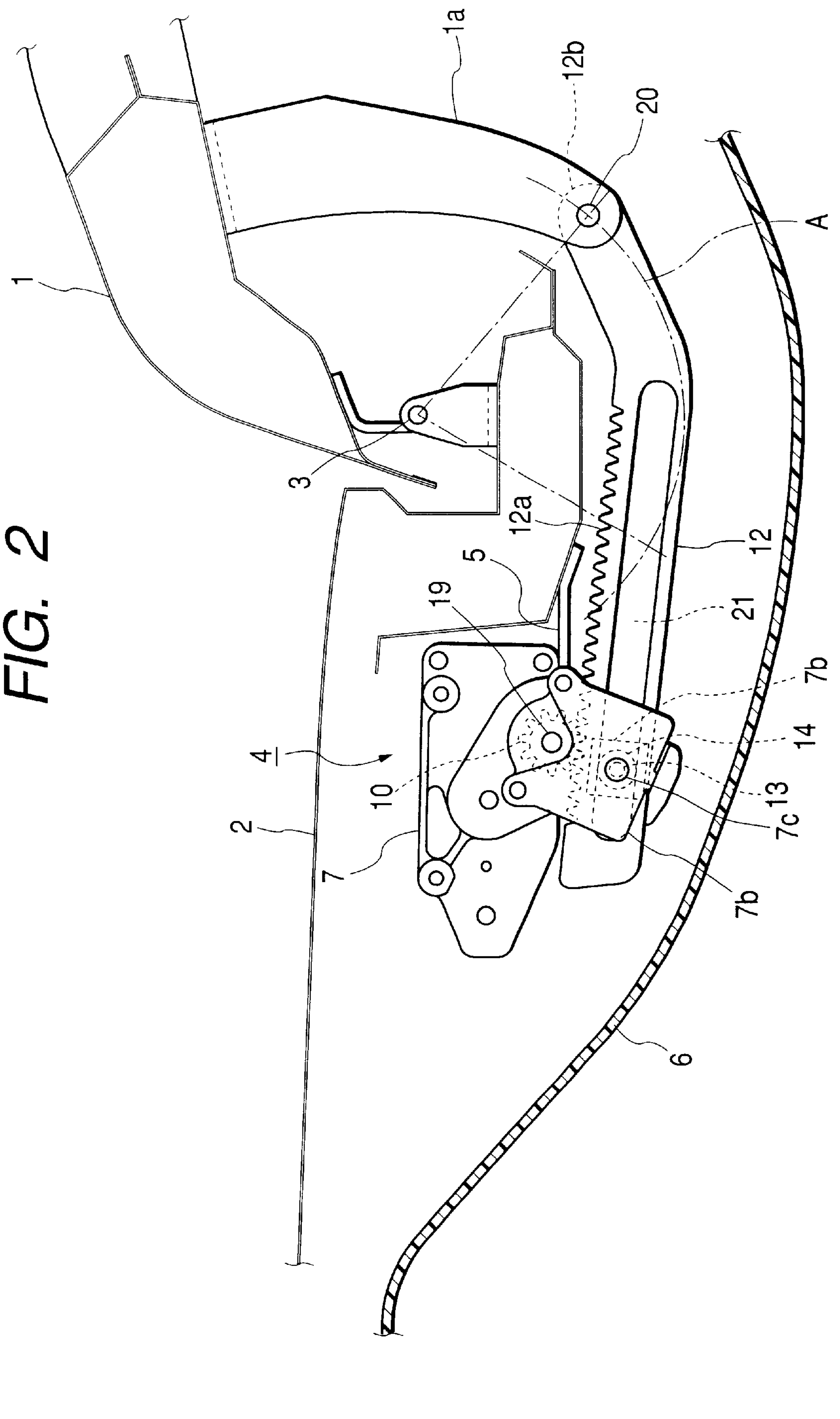
FIG. 2 is a schematic side view in longitudinal section of the rear portion of the vehicle when the opening and closing member is in wide-open position in the first embodiment of the invention.

A first embodiment of the invention will hereinafter be described with reference to FIGS. 1 to 4. Further, in the following description, the left hand in FIGS. 1 and 2 is expressed as the "front" of the vehicle body, and the right hand as the "rear".

A back door 1 provided as an opening and closing member opens and closes a rear opening of the vehicle body. The back door 1 is pivotally secured by a transversely oriented hinge axis 3 on the rear end portion of a roof 2 of the vehicle such as a station wagon etc. so as to be vertically openable and closeable.

A drive mechanism body 4 is fixed by a fixing bracket 5 to the roof 2 on the rear portion of the vehicle body. The drive mechanism body 4 is connected to the door 1 through a rack rod 12 to be described later, and allows the door 1 to be automatically opened and closed by operating the operation switch (not shown) provided in place in the vehicle to supply an electric power. A roof trim 6 is fixed to the roof 2 and conceals the drive mechanism body 4 so as not to be exposed to the interior side.

Figure 4:
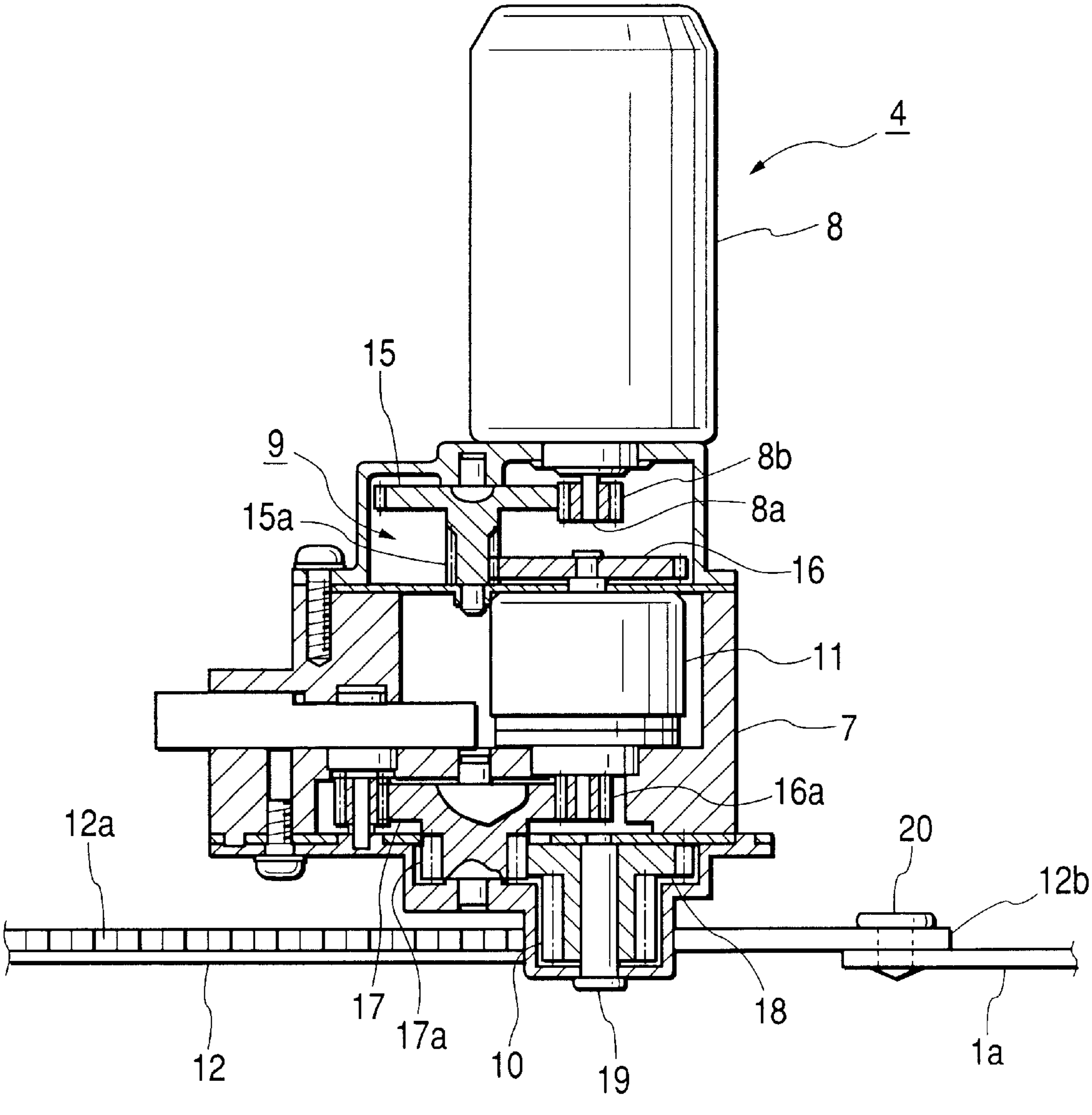
FIG. 4 is transverse sectional view taken on line IV—IV of FIG. 1 in the first embodiment of the invention.

The drive mechanism body 4, as shown in FIG. 4, mainly includes a housing 7 fixed to the roof 2, a motor 8 which rotates in forward and reverse directions, a speed reduction device 9 for decelerating rotation of the motor 8, a pinion 10 which is provided in the output portion of the speed reduction device 9 and rotated in forward and reverse directions by the rotation of the motor 8, an electromagnetic clutch 11 disposed within the speed reduction device 9, and the rack rod 12 which has a rack 12*a* engaging the pinion 10 provided on the upper edge, and is oriented and movable in a substantially longitudinal direction of the vehicle.

Figure 3:
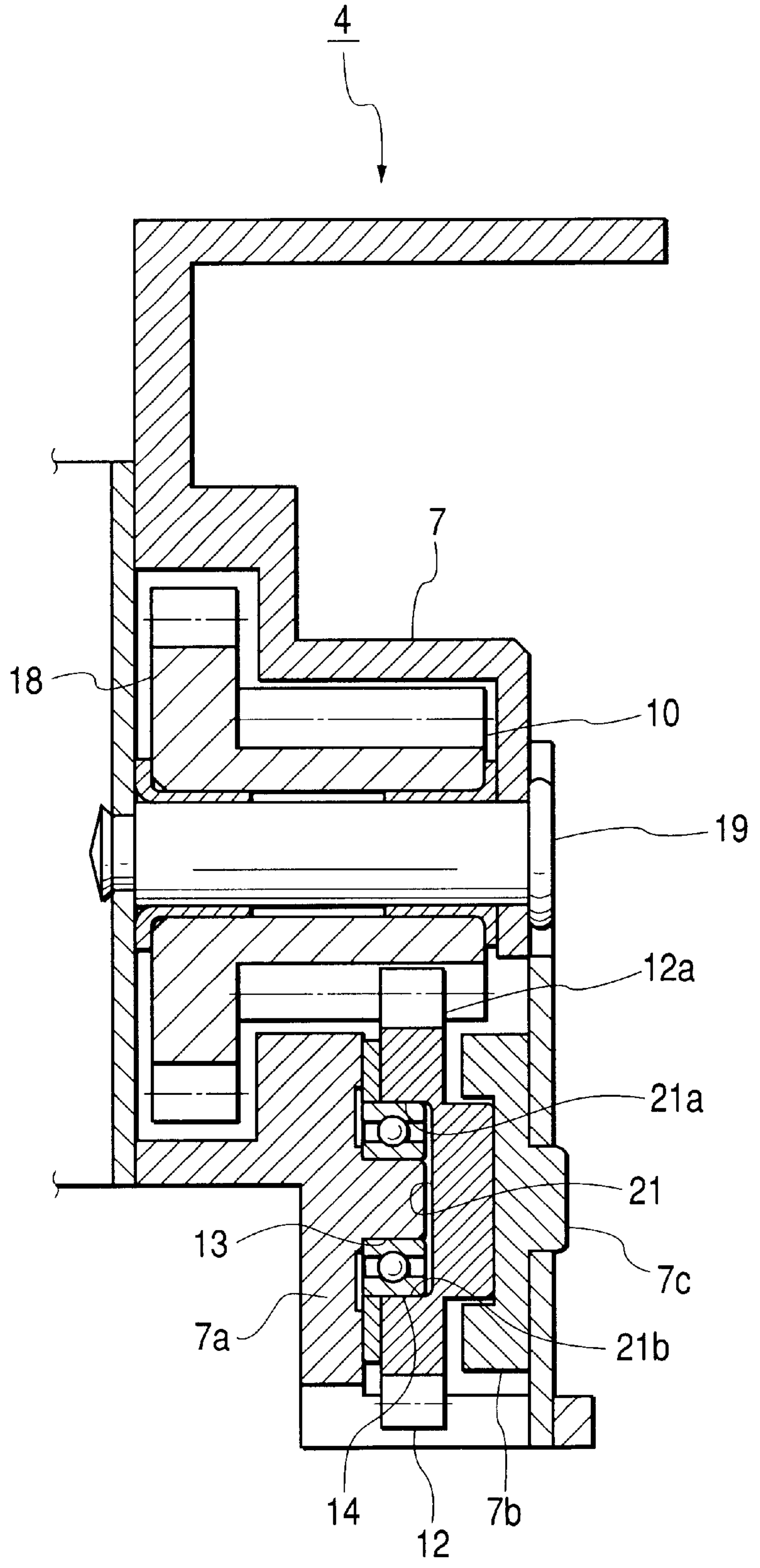
FIG. 3 is a longitudinal section view taken on line III—III of FIG. 1 in the first embodiment of the invention.

Below the pinion 10 in the housing 7, mainly as shown in FIG. 3, there is provided right and left retaining members 7*a* and 7*b*. A guide member 14 is pivotally mounted on the inner surface of the left retaining member 7*a* by a transversely directed axis 13 with respect to the vehicle body. The right retaining member 7*b* is pivotally supported on the housing 7 by a transversely directed axis 7*c*. The guide member 14 in this embodiment is provided with a ball bearing and serves as a roller.

The motor 8, as shown in FIG. 4, is fixed to the side surface of the housing 7 with an output axis 8*a* oriented in the transverse direction of the vehicle, and is rotated in a predetermined direction.

The speed reduction device 9 is provided within the housing 7 and formed of a plurality of intermediate gears 15, 15*a*, 16, 16*a*, 17, 17*a* and 18 which engage a spur gear 8*b* fixed to the output axis 8*a* of the motor 8 to sequentially decelerate the driving force of the motor 8.

The pinion 10 is provided on one side surface of an intermediate gear 18 which is pivotally supported on the housing 7 by a pinion axis 19 transversely oriented with respect to the vehicle body.

The clutch 11 is disposed on the way of the linkage line between the intermediate gears 16 and 17, and normally quits the linkage between the intermediate gears 16 and 17, while the power supply produced by the operation of the operation switch allows the intermediate gears 16 and 17 to be linked to each other and the driving force of the motor 8 to be transmitted to the pinion 10.

As shown in FIG. 1, the rack 12*a* engaging the pinion 10 is provided on the upper edge of the rack rod 12 oriented longitudinally in the vehicle, and a connecting portion 12*b* at the rear end is rotatably connected by a transversely directed connecting axis 20 to the front end portion of a connecting bracket 1*a* fixed to the portion spaced from the hinge axis 3 of the door 1.

Either side surface of the rack rod 12 is longitudinally slidably clamped between the retaining members 7*a* and 7*b*, and a longitudinally oriented guide groove 21 having an U-shaped cross section is provided on one side surface opposite the retaining member 7*a*.

The guide groove 21, as shown in FIG. 3, mainly has opposite surfaces 21*a* and 21*b* vertically opposed to each other, and is formed by having one side surface extruded toward the other side surface by press working.

The guide member 14 is fitted into the guide groove 21. The guide member 14 is longitudinally rolled and slides along the upper and lower opposite surfaces 21*a* and 21*b* of the guide groove 21, thereby restraining the vertical motion of the rack rod 12 such that the rack 12*a* and the pinion 10 can properly engage each other.

The rack rod 12, with the guide groove 21 being brought into engagement with the guide member 14, is retained between the retaining members 7*a* and 7*b* so as to be rotatable around the axis 13 of the guide member 14 while moving in the longitudinal direction of the vehicle such that the connecting portion 12*b* can be moved along a circular-arc locus A formed around the hinge axis 3 accompanying the opening and closing operation of the door 1.

When the door 1 is in a closed state, the rack rod 12 slants upward to the front as shown in FIG. 1. In this state, once the operation switch is operated for opening, the clutch 11 is brought into connected position. Also, the motor 8 is rotated forward, and the pinion 10 is forwardly rotated in counterclockwise as seen in FIG. 1 via the speed reduction device 9 and the clutch 11.

By the rotation of the pinion 10, the rack rod 12 is moved rearward while engaging the pinion 10, pushes out the door 1 rearward with the connecting bracket 1*a*, and upwardly rotates the door 1 around the hinge axis 3 to the wide-open position shown in FIG. 2

When the door 1 is moved from the closed-up position to the wide-open position, the rack rod 12, while moving rearward, is rotated counterclockwise around the axis 13 of the guide member 14, and the connecting portion 12*b* is moved along the circular-arc locus A. Once the door 1 reaches to the wide-open position, the rack rod 12 stands substantially horizontal as shown in FIG. 2.

In the wide-open state, when the operation switch is operated for close, the pinion 10 is rotated clockwise in reverse. Thereby, the rack rod 12 is moved forward, and by the motion in the reverse fashion to the above operation, the door 1 is moved to the closed-up position.

As described above, according to the invention, the rack rod 12 is arranged to be rotated around the axis 13 of the guide member 14 such that the connecting portion 12*b* of the rack rod 12 can be moved along the circular-arc locus A. Hence, without interposing the ball joint etc. as in the conventional art, the door 1 and the drive mechanism body 4 can be directly connected to each other by the rack rod 12.

In the above embodiment, the guide groove 21 is formed as a concave groove on the side surface of the rack rod 12. Alternatively, even if the guide groove 21 is bored as a long through hole on the side surface of the rack rod 12, a similar effect can be produced.

Figure 5:
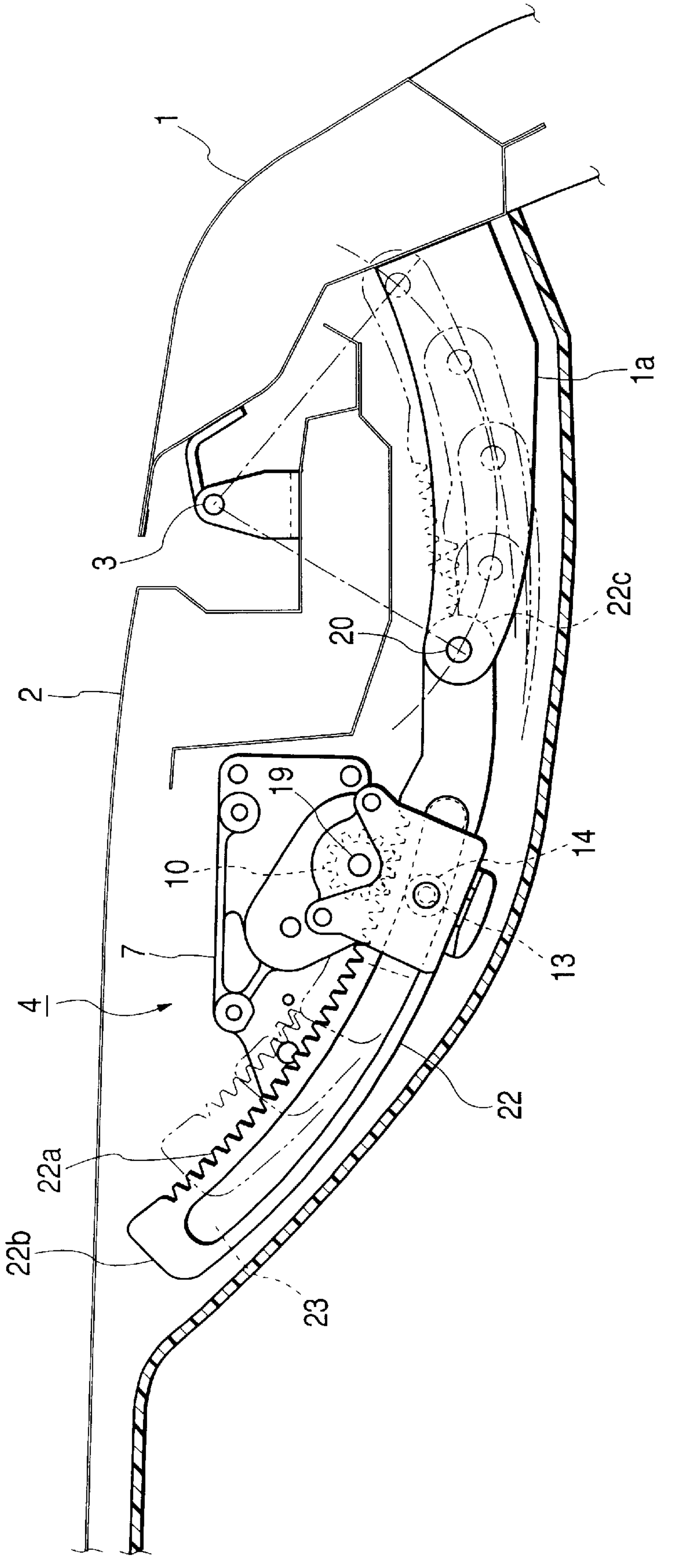
FIG. 5 is a schematic side view in longitudinal section of the rear portion of the vehicle in a second embodiment of the invention.

FIG. 5 shows a second embodiment of the invention.

The rack rod 22 and the guide groove 23 in this embodiment form the arc having a center of curvature on the pinion 10 side, i.e., a downwardly-convex arc-shape in side view. Also, as in the above first embodiment, the rack rod 22 is retained on the housing 7 such that the rack 22*a* can be longitudinally moved while engaging the pinion 10 and also can be rotated around the axis 13 of the guide member 14.

According to the second embodiment, as shown in FIG. 5, since the rack rod 22 is formed in arc-shape, the rack rod 22 can be moved as shown by the imaginary lines with respect to the opening amount of the door 1 from the position shown in full line corresponding to the closed-up position of the door 1. By such movement, the movement loci of the front and rear end portions 22*b* and 22*c* of the rack rod 22 can be displaced upwardly as compared with the loci formed by a straight rack rod, i.e., so as to approximate to the roof 2 side. Accordingly, the roof trim 6 can be formed in such a manner that the attachment space for the drive mechanism body 4 is made thin in side view. As a result the enlargement of the overhead clearance for the rear seat occupant is achieved.

Further, in the above embodiment, the entire portion of the rack rod 22 is formed in arc-shape. Alternatively, even if a partial portion thereof is formed in arc-shape, a similar effect can be produced.

Since another arrangement is identical to that of the previous embodiment, the portions providing the same operations are given the same reference numerals as in the above embodiment, and the detailed description will be omitted.

Figure 6:
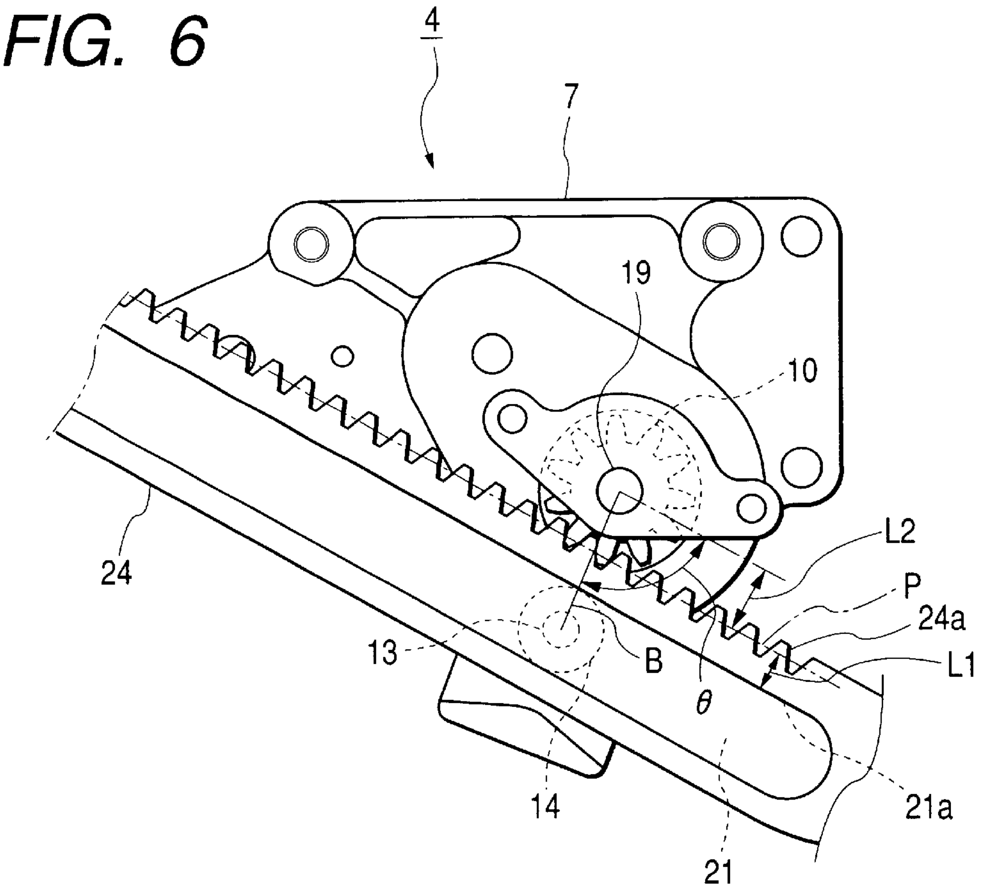
FIG. 6 is a side view of the substantial portion when the door is in closed-up position in a third embodiment of the invention.
Figure 7:
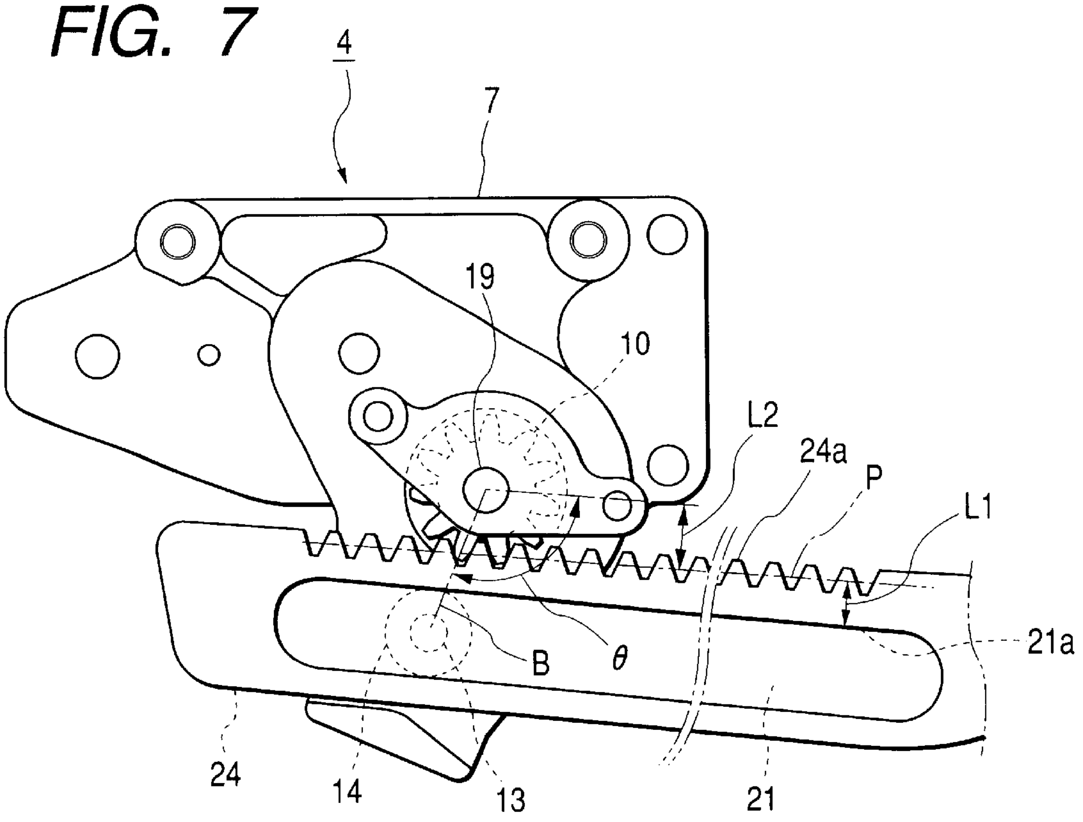
FIG. 7 is a side view of the substantial portion when the door is in wide-open position in the third embodiment of the invention.

FIGS. 6 and 7 show a third embodiment of the invention, and FIG. 6 shows a side view of the substantial portion when the door is in closed position, whereas FIG. 7 shows a side view of the substantial portion when the door is in opened position.

In this embodiment, it is arranged that a distance L1 between the pitch line P of the rack 24*a* and the center line of the guide groove 21, more accurately the upper inner surface 21*a* of the guide groove 21, is changed along the longitudinal direction of the rack rod 24 so as to be gradually reduced toward the rear, namely such that the tilt angle θ of the rack rod 24 with respect to the straight line B connecting the axle center of the pinion 10 with the center of the guide member 14 becomes less, the farther separated from the right angle, whereby the rack 24*a* and the pinion 10 always properly engage each other.

In case the distance L1 is constant, when the rack rod 24 is rotated while being longitudinally moved accompanying the opening and closing operation of the door 1, the distance L2 between the pitch line P and the pinion axis 19 is changed in accordance with the direction of the rack rod 24.

Specifically, the rack rod 24 approaches substantially perpendicularly relative to the straight line B in the closed-up position shown in FIG. 6, whereas it approaches diagonally relative to the straight line B in the wide-open position shown in FIG. 7. Accordingly, it follows that the distance L2 in the wide-open position becomes narrower than the distance L2 in the closed-up position, and the engagement allowance between the rack 24*a* and the pinion 10 is changed in each position.

However, according to the third embodiment, since the distance L1 is changed in response to the direction of the rack rod 24 in each position of the door 1, the distance L2 can always be made constant, so that the pinion 10 and the rack 24*a* can always be brought into proper engagement with each other, and a smooth operation can be achieved.

Further, this embodiment is also applicable to the previous second embodiment.

Since another arrangement is identical to that of the previous embodiment, the portions providing the same operations are given the same reference numerals as in the above embodiment, and the detailed description will be omitted.

According to the invention, the following effects can be produced.

(a) According to the invention, since the rack rod is arranged to be rotatable around the axis line of the guide member, the drive mechanism body fixed to the vehicle body and the opening and closing member can be directly connected to each other by the rack rod without interposing a ball joint etc. as in the conventional art, thus enabling attainment of a reduction in cost.

Also, since the opening and closing member can be moved in an opening and closing direction by the rack rod, there is no need for securing the space to admit of the horizontal rocking motion of a sector gear as in the conventional art, and the attachment space for the drive mechanism body is reduced, thus enabling achievement of the enlargement of an interior space.

(b) According to the invention, since the guide member can be rolled within the guide groove, the rack rod can be moved in the longitudinal direction and rotation direction thereof.

(c) According to the invention, without lowering the rigidity of the rack rod, the vertical width of the rack rod can be narrowed, and by extension the drive mechanism body can be made thin, thus enabling achievement of the enlargement of the interior space.

(d) According to the invention, the lateral oscillation of the rack rod is prevented, and the engagement between the rack and the pinion can be secured.

(e) According to the invention, the guide member can be brought into secure engagement with the guide groove.

(f) According to the invention, since the movement locus accompanying the opening and closing operation of the opening and closing member can be approximated to the roof surface, the occupancy area in the direction of thickness of the drive mechanism body is made small, and the enlargement of the interior space can be achieved.

(g) According to the invention, the rack and the pinion can always be brought into engagement with each other in the proper state, and a smooth operation can be attained.

What is claimed is:

1. An opening and closing apparatus for an opening and closing member of a vehicle body, said opening and closing member being pivotally supported on said vehicle body, comprising:

a housing attached to said vehicle body;

a motor mounted in said housing;

a pinion rotatably mounted in said housing and connected to said motor;

a rack rod provided with a rack engaging with said pinion on an edge portion thereof and a longitudinal guide groove formed thereon;

a guide member provided in said housing slidably fitted in said longitudinal guide groove and rotatably supporting said rack rod;

wherein said rack rod is pivotally connected to a part of said opening and closing member at an end portion thereof.

2. An opening and closing apparatus according to claim 1, wherein said guide member is pivotally mounted in said housing.

3. An opening and closing apparatus according to claim 1, wherein said guide groove is provided with a substantially U-shaped cross section on one side surface of said rack rod, and said guide member is provided with a roller which rolls and slides along upper and lower opposite surfaces of said guide groove.

4. An opening and closing apparatus according to claim 1, wherein either side surface of said rack rod is clamped by a retaining member provided on said housing.

5. An opening and closing apparatus according to claim 4, wherein said guide member is provided on a surface of said retaining member which is opposite to one side surface of said rack rod.

6. An opening and closing apparatus according to claim 1, wherein said rack rod and said guide groove are respectively shaped in a substantially arc-shape in longitudinal direction thereof having a center of curvature on a side on which said pinion is provided.

7. An opening and closing apparatus according to claim 1, wherein a distance between a pitch line of said rack and a center line of said guide groove is changed along a longitudinal direction of said rack rod in such a manner as to become smaller when a tilt angle of said rack rod with respect to a straight line connecting an axle center of said pinion with a center of said guide member gets away from a right angle.

8. A combination of a vehicle body, an opening and closing member and an opening and closing apparatus, comprising:

said vehicle body;

said opening and closing member pivotally supported on said vehicle body at a hinge axis transversely directed with respect to said vehicle body; and said opening and closing apparatus comprising, a motor mounted in said vehicle body, a pinion pivotally rotatably mounted in said vehicle body with a first axis transversely directed with respect to said vehicle body and connected to said motor, a rack rod provided with a rack engaging with said pinion on an edge thereof and a longitudinal guide groove formed thereon, and a guide member provided in said housing slidably fitted in said longitudinal guide groove and rotatably supporting said rack rod with a second axis substantially parallel to said first axis, wherein said rack rod is pivotally connected at an end portion thereof with a third axis transversely directed with respect to said vehicle body to a part provided on said opening and closing member and separated from said hinge axis of said opening and closing member.

9. A combination of a vehicle body, an opening and closing member and an opening and closing apparatus according to claim 8, wherein said guide member is pivotally mounted in said vehicle body with an axis transversely directed with respect to said vehicle body.

* * * * *